March 4, 1947  F. ULRICH  2,416,804
SEEDING MACHINE DISCHARGER
Filed July 11, 1945  2 Sheets-Sheet 1
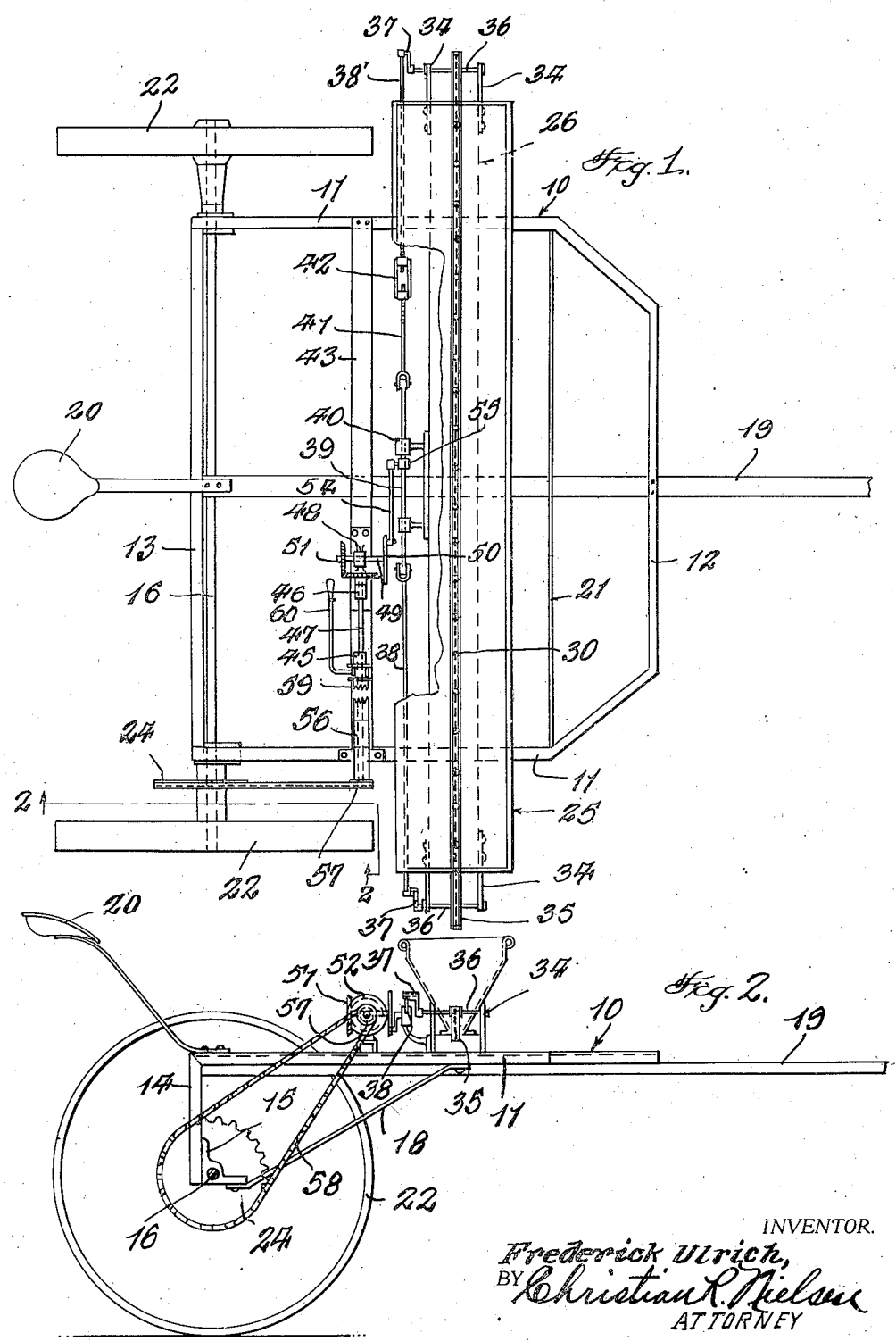
INVENTOR.
Frederick Ulrich,
BY Christian R. Nielsen
ATTORNEY March 4, 1947.  F. ULRICH  2,416,804
SEEDING MACHINE DISCHARGER
Filed July 11, 1945  2 Sheets-Sheet 2
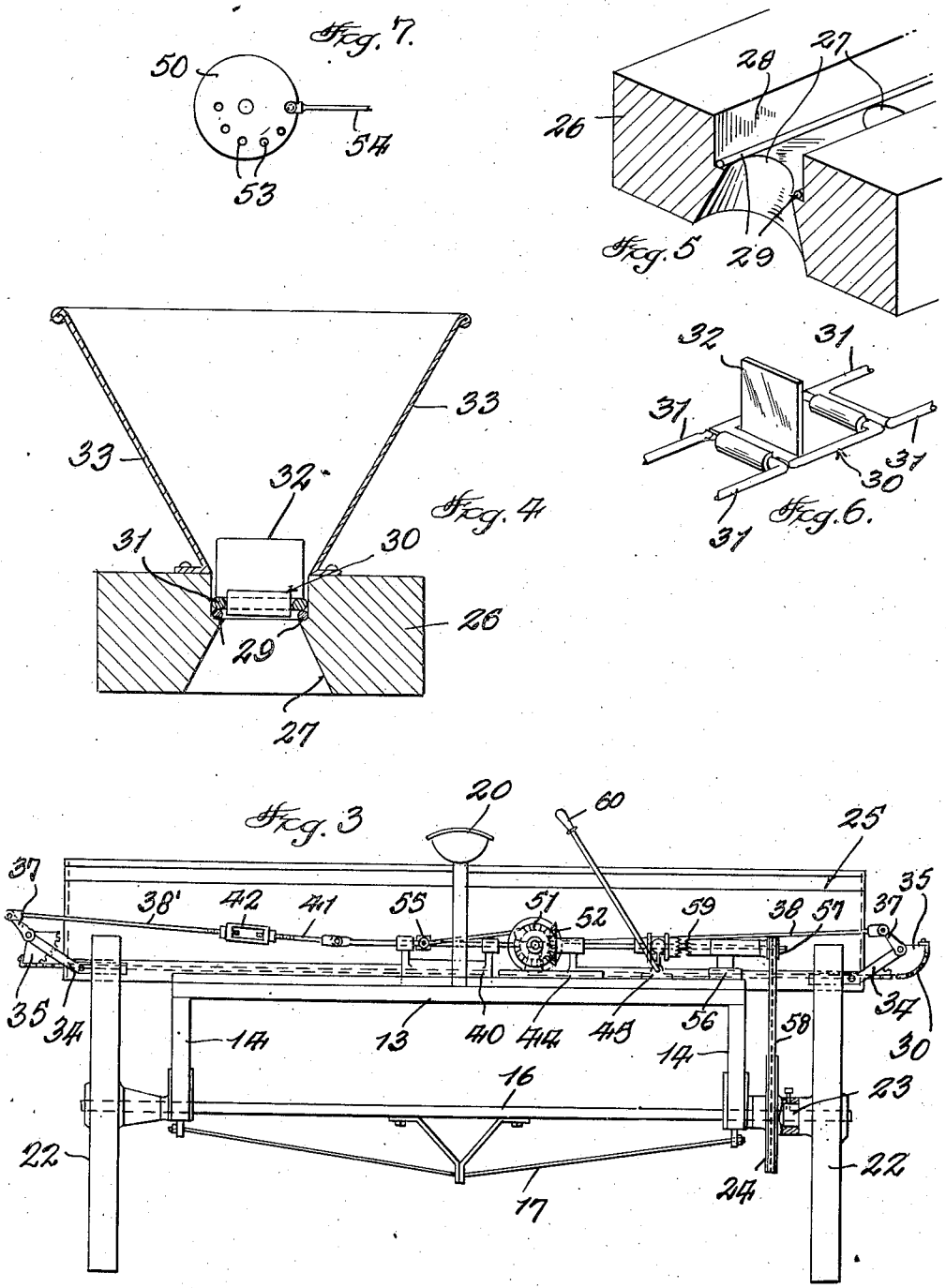
INVENTOR.
Frederick Ulrich,
BY Christian R. Nielsen.
ATTORNEY Patented Mar. 4, 1947

2,416,804

UNITED STATES PATENT OFFICE 2,416,804

SEEDING MACHINE DISCHARGER

Frederick Ulrich, Hoskins, Nebr.

Application July 11, 1945, Serial No. 604,479

4 Claims. (Cl. 275—9)

This invention relates to a seeding machine, and it consists in the constructions, arrangements and combinations herein described and claimed.

It is an important object of the invention to provide a construction of machine for broadcasting of brome grass seed, although not limited thereto, the uniform distribution of which is effective under forward motion of the machine.

More specifically, it is an object of the invention to provide a wheeled frame structure upon which there is mounted a transversely disposed seed hopper, having means in the base thereof for discharge of seed the means being in the form of a reciprocating chain element actuated by mechanism operated through one of the wheels of the machine.

It is also an important object of the invention to provide an adjusting means whereby the tension on the reciprocating chain member may be adjusted to compensate for wear of the operating parts as well as providing a trackway for support of the chain so as to reduce friction and wear between the chain and the base of the hopper.

Additional objects, advantages and features of invention will be apparent from the following description considered in conjunction with the accompanying drawings, wherein Figure 1 is a top plan view of the machine constructed in accordance with the invention, a portion of the hopper being broken away, to illustrate certain operating mechanism.

Figure 2 is a cross section on the line 2—2 of Figure 1.

Figure 3 is a rear elevation of the machine.

Figure 4 is an enlarged cross section through the hopper.

Figure 5 is an enlarged fragmentary perspective of the seed distributer base.

Figure 6 is an enlarged detail perspective of the seed distributer chain.

Figure 7 is a side elevation of an eccentric employed in the machine for varying the travel of the distributer chain.

There is illustrated a frame 10, which may be formed from channel iron, consisting of side stringers 11, connected at their ends by a front stringer 12 and a rear stringer 13. As may be seen in Figures 2 and 3, a pair of depending brackets 14 are secured to the underside of the rear stringer 13, each of which mount at their lower ends a bearing bracket 15 for mounting of a shaft 16 extending transversely beneath the frame 10.

In order to afford rigidity to the axle and the frame structure generally, a trussed rod 17 is secured and extended between the lower ends of the depending brackets 14.

The bearing brackets 15 may be welded or bolted to the brackets 14 and may be additionally supported by brace rods 18 secured thereto and to the sides of stringers 11.

A draft tongue 19 is secured medially of the frame, being bolted or otherwise secured to the front stringer 12 and the rear stringer 13.

An operator's seat 20 is also located medially of the frame, bolted to the rear end of the draft tongue 19.

The forward portion of the frame 10 is braced by a rod 21 fixed between the side stringers 11 as shown in Figure 1.

A traction wheel 22 is loosely mounted upon respective ends of the axle 16, that wheel positioned upon the right of the frame as viewed from the rear, being provided with a hub extension 23 upon which there is fixed a sprocket 24 for operating the seed distributer mechanism, as will now be described.

Upon a forward portion of the frame 10, extending transversely thereof, a seed hopper 25 is mounted, of a length so as to extend beyond the sides of the frame. The hopper 25 consists of a distributer base 26 provided with a plurality of openings 27 spaced longitudinally of the base through which seed will be discharged. As shown, the openings are of tapered formation, the larger opening being presented to the underside of the base, while the smaller opening is presented upon the base of a channel 28 formed in the distributer base 26. At respective sides of the channel 28 cylindrical guide rods 29 are secured for support of a feeder chain 30. The chain 30 consists of a plurality of links hingedly connected together, the links being of a width to present respective side frame pieces 31 directly upon the guide rods 29, as may be seen in Figure 4. A vertically disposed plate 32 is secured to every fifth link of the chain, for a purpose presently to be explained.

The hopper 25 is the same length as the base 26 and has inwardly tapered side walls 33 terminating at the side portions of the channel 28. The channel 28 opens upon respective ends thereof for passage of the chain therethrough, and rockably supported in brackets 34 at the ends of the base 26 there is a sector gear 35. The ends of the chain are connected to respective gears as may be seen in Figure 3. The gears 35 are each supported upon a shaft 36 to which a crank 37 is secured. The crank 37 associated with the shaft to the right of the machine has pivotally connected thereto a link 38, while the crank to the left has connected thereto a link 38'. The link 38 is pivotally connected to one end of a draft link 39 reciprocably mounted in a dual bearing 40 fixed upon the base 26. The other end of the draft link is pivotally connected to a link 41, the latter being threadedly engaged in one end of a turn buckle, 42. The other end of the turn buckle threadedly receives the link 38'. It will be understood that by adjustment of the turnbuckle, tension on the distributor chain 30 may be varied, as well as to accommodate for wear.

A transverse beam 43 is mounted upon the frame 10 rearwardly of the hopper 25, and upon this beam a gearing bracket 44 and a clutch bracket 45 are secured. The gearing bracket consists of a bearing 46 for support of a shaft 47 and a bearing 48 disposed at right angles to the bearing 46. The bearing 48 mounts a shaft 49 upon one end of which there is a disk 50, the opposite end of the shaft having a bevel gear 51 fixed thereto. The bevel gear 51 is in mesh with a similar gear 52 fixed on the adjacent end of the shaft 47.

The disk 50 is provided with a series of openings 53 with which a connecting rod 54 may be selectively engaged. The connecting rod 54 is connected to the draft link 39 as indicated at 55.

The shaft 47 is further supported by a bearing 56 and the outer end of the shaft 47 has fixed thereon a sprocket 57 aligned with the sprocket 24 and about these sprockets there is trained a chain 58. Upon the shaft 47 a clutch device 59 is mounted operable by means of a hand lever 60 within reach of the operator of the machine.

In operation, it will be seen that upon forward movement of the machine with the clutch 59 engaged, to and fro movement of the chain 30 will be effected and under such movement seed within the hopper 25 will be agitated and the plates 32 will move the seed for discharge through the openings 27 of the base 26 for discharge to the ground.

While I have shown and described a preferred form of the device, this is by way of illustration only, and I consider as my own all such modifications in construction as fairly fall within the scope of the appended claims.

I claim:

1. A seeding machine comprising a frame, a pair of traction wheels for support of said frame, a hopper transversely of the frame, said hopper having a base provided with a channel throughout the length thereof, said base further having a plurality of longitudinally spaced openings, guide rods in said channel at respective sides thereof, a chain disposed within the channel and supported by said guide rods, said chain having spaced upright plate members, a shaft at each end of said hopper, a sector gear on each shaft and in alignment with said chain for securement thereto, means on the frame for rocking each shaft, and means associated with one of said wheels for actuating said means.

2. A seeding machine comprising a frame, a pair of traction wheels for support of said frame, a hopper transversely of the frame, said hopper having a base provided with a channel throughout the length thereof, said base further having a plurality of longitudinally spaced openings, guide rods in said channel at respective sides thereof, a chain disposed within the channel and supported by said guide rods, said chain having spaced upright plate members, a shaft at each end of said hopper, a sector gear on each shaft and in alignment with said chain for securement thereto, a crank on each shaft, link means between said cranks, said link means including a draft link, gearing carried by said frame, including a driven shaft, a disk on said shaft, a connecting rod between said disk and said draft link, said gearing including a second shaft, a clutch device associated with said second shaft, a sprocket on one of said wheels, a sprocket on said second shaft aligned with the sprocket on said wheel and a chain trained about said sprockets.

3. The structure of claim 2 in which the link means includes a turn buckle for adjusting the tension of said chain.

4. The structure of claim 2 in which the disk includes a plurality of openings for selective engagement of said connecting rod.

FREDERICK ULRICH.

REFERENCES CITED

The following references are of record in the file of this patent:

UNITED STATES PATENTS

| Number | Name | Date |
|---|---|---|
| 370,120 | Churchill | Sept. 20, 1887 |
| 1,304,321 | Julien | May 20, 1919 |
| 1,291,995 | Melland | Jan. 21, 1919 |
| 2,200,773 | Finne | May 14, 1940 |

FOREIGN PATENTS

| Number | Country | Date |
|---|---|---|
| 327,965 | Great Britain | Apr. 14, 1930 |